O. C. FUNDERBURK.
FUEL SUPPLY SYSTEM FOR CARBURETERS.
APPLICATION FILED OCT. 8, 1914.
1,149,192.
Patented Aug. 10, 1915.
2 SHEETS—SHEET 1.
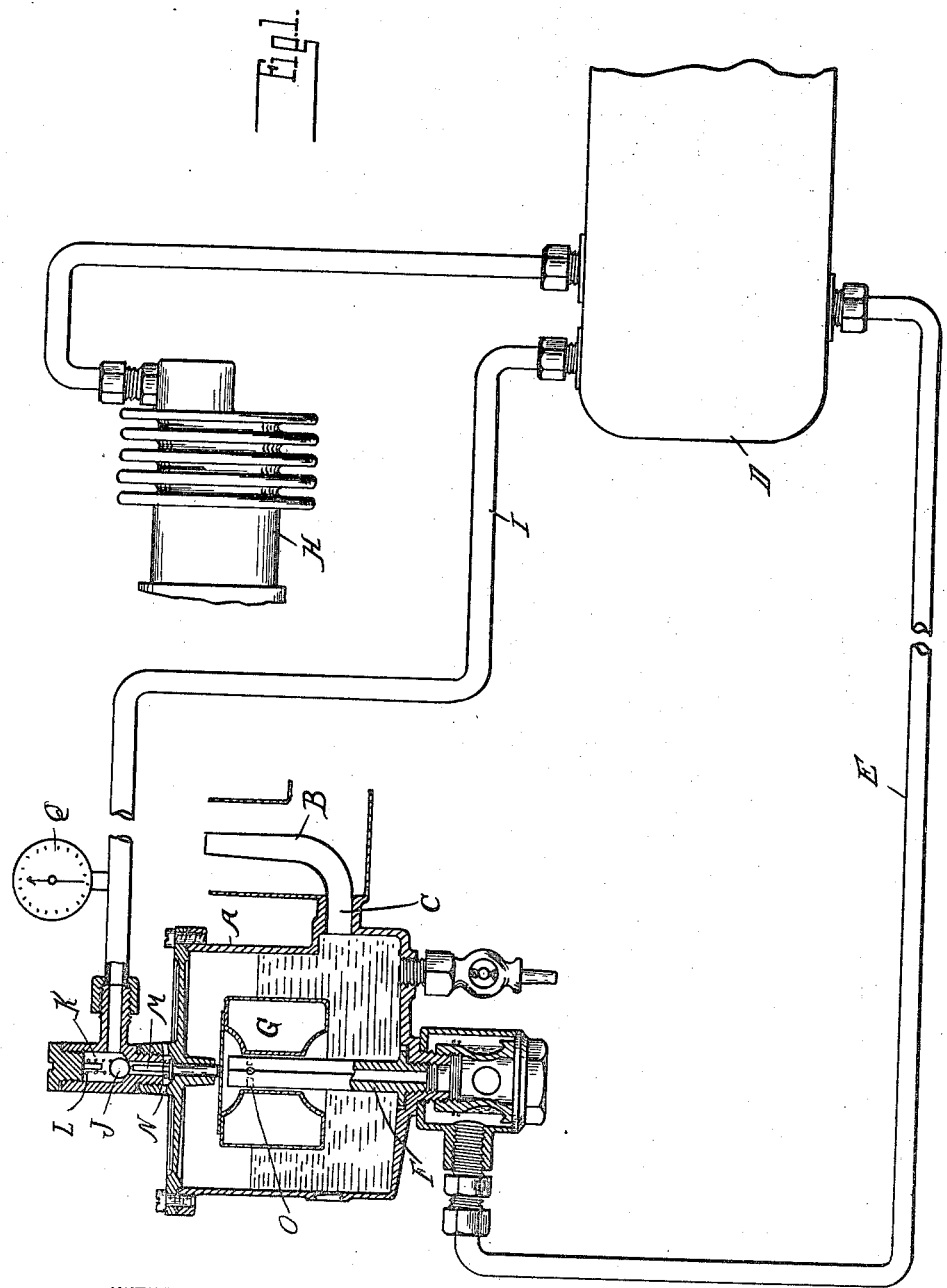
WITNESSES:
W. K. Ford
James O. Barry
INVENTOR
Otis C. Funderburk
BY
Whittemore Hulbert & Whittemore
ATTORNEYS

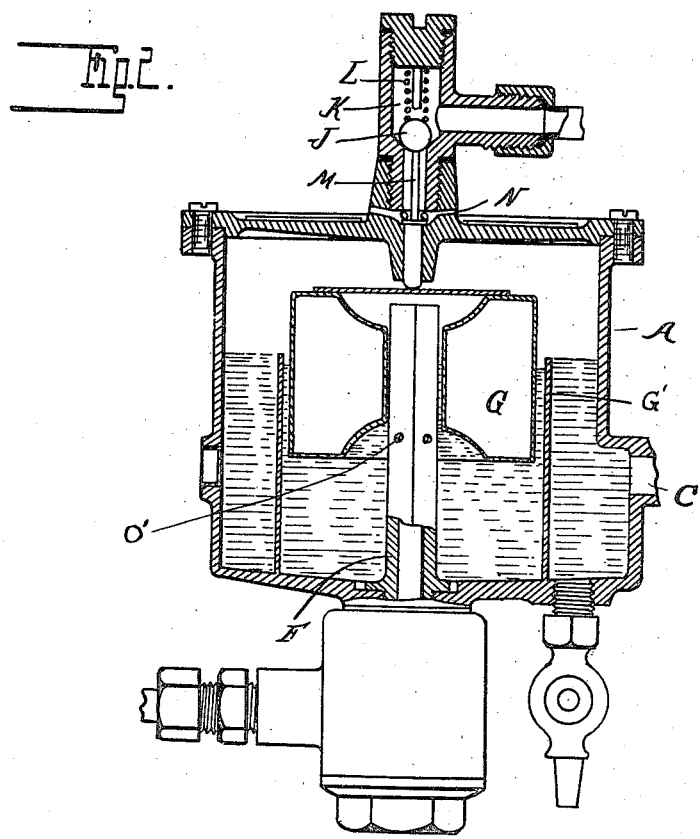

UNITED STATES PATENT OFFICE.

OTIS C. FUNDERBURK, OF DETROIT, MICHIGAN, ASSIGNOR TO DETROIT LUBRICATOR COMPANY, OF DETROIT, MICHIGAN, A CORPORATION OF MICHIGAN.

FUEL-SUPPLY SYSTEM FOR CARBURETERS.

1,149,192.     Specification of Letters Patent.     Patented Aug. 10, 1915.

Application filed October 8, 1914. Serial No. 865,624.

*To all whom it may concern:*

Be it known that I, OTIS C. FUNDERBURK, a citizen of the United States of America, residing at Detroit, in the county of Wayne and State of Michigan, have invented certain new and useful Improvements in Fuel-Supply Systems for Carbureters, of which the following is a specification, reference being had therein to the accompanying drawings.

The invention relates to systems for supplying liquid fuel to carbureters, and more particularly to systems of that type in which the fuel supply tank is located below the level of the carbureter. It is usual with such systems to elevate the oil or liquid fuel from the supply tank to an auxiliary tank located above the level of the carbureter and to feed the oil from this auxiliary tank by gravity to the float chamber of the carbureter, where it is controlled in the usual manner. The oil is usually raised by air pressure above the oil in the supply tank, and while regulating devices are provided for preventing an over-pressure there is always danger of this becoming inoperative and the consequent flooding of the carbureter with oil.

It is the object of the present invention to obtain a system in which the supply tank is below the level of the carbureter and the auxiliary tank is dispensed with.

It is a further object to dispense with the usual float control needle valve and to maintain at all times open communication between the supply tank and the discharge nozzle in the carbureter. At the same time the construction is such that a constant liquid static pressure is maintained on the oil column leading to the nozzle, and such that the level due to such pressure will never rise above the discharge end of the nozzle.

In the drawings: Figure 1 shows my improved system diagrammatically in connection with a carbureter, a supply tank and an air pump; and Fig. 2 shows a modified construction.

A is the float chamber of a carbureter and B is the discharge nozzle communicating with said chamber through the passage C.

D is a liquid fuel supply tank which is arranged at a level below that of the float chamber A and nozzle B. To feed the oil from the tank D to the chamber A a conduit E is connected to the bottom of the tank and extends to the bottom of the chamber A. Here it is preferably connected to a hollow stem F passing centrally upward in the chamber A, said stem also constituting a guide for a float G. The oil is elevated by air pressure upon the liquid in the tank D, which is supplied from a mechanically driven air pump H.

To limit the air pressure in the tank D an escape pipe I is connected thereto and extends to a point in proximity to the chamber A, preferably centrally above the top thereof. At this point is located a valve J which is automatically seated and is raised from its seat by the rising of the float G above a predetermined level. As specifically shown, the valve J is a ball arranged in a hollow casing K engaging a threaded nipple on the top of the chamber A, a spring L holding the ball to its seat and a stem M passing downward into the valve chamber serving to unseat the valve. This stem rests centrally upon the top of the float G in alinement with the hollow guide stem F, and the arrangement is such that the rising of the float above the predetermined level will unseat the valve and open communication to escape ports N in the casing K.

The oil which is fed upward through the conduit E to the hollow stem F escapes through lateral ports O in said stem, and as the float which is sleeved on the stem surrounds these ports there is no danger of causing an agitation which would disturb the normal level.

With the construction as described in operation, the float G initially rests upon the top of the hollow stem F and permits the valve J to seat. When air pressure is developed by the pump H the oil in the tank is forced upward through the conduit E and hollow stem F to fill the chamber A, and when the normal level is reached the float G will be raised to a point where, acting upon the stem M, it will unseat the valve J. This will permit an escape of air from the conduit I through the vent ports N, and at this lowers the air pressure it will prevent further elevation of the oil. Thus a balance will be reached where the air is permitted to escape in just such quantity as to maintain a constant pressure upon the oil in the tank D, this pressure being equal to that of the liquid static column of oil in the conduit E and chamber A. Any higher pressure is instantaneously checked by the rise of the float G and a further opening of the valve J, while any drop in pressure will lower the float and seat the valve J. When the pump H is not in operation the escape of air pressure may permit the oil in the conduit E to drop to the level in the tank D, but the oil which is in the chamber A is trapped and the level cannot drop below that of the ports O. Consequently when the engine is started there will be a supply of oil in the chamber A for initial operation, and before the level of oil in the chamber is materially dropped air pressure will be developed by the pump H, which will again raise the oil in the conduit E.

My improved system has obvious advantages over the systems employing the auxiliary elevated tank; first, in that it dispenses with this tank and connecting conduits and uses only the float chamber of the carbureter; second, the carbureter construction is simplified by dispensing with the float operated needle valve; and third, flooding from the usual causes is absolutely prevented as the rise of oil is not dependent upon the perfect seating of any liquid-controlling valve, and furthermore the greatest height obtained is insufficient to raise the oil above the discharge end of the nozzle provided of course that the float is properly performing its functions. Imperfect seating of the valve J will not render the system inoperative, for the capacity of the pump may be made sufficient to maintain the pressure where there is a slight leakage of air. On the other hand the air pressure can never rise higher than the predetermined amount, as the valve J when fully unseated will open a vent of sufficient area to exhaust the maximum air pressure.

When the level of the liquid in the supply tank is lowered by the consumption of the oil it is obvious that the pressure of the air must be raised to compensate for the increased liquid static pressure of the liquid column leading to the discharge nozzle. This increase of pressure is automatically accomplished by the operation of the float in conjunction with the escape valve J with a result that the liquid level in the float chamber remains constant. To indicate the quantity of oil in the supply tank I make use of this varying air pressure, which operates a gage suitably calibrated to indicate the level of the oil. As shown, Q is a gage which may be located at any convenient point and is connected with the conduit I, or otherwise is placed in communication with the air space in the tank D. In operation when the tank is full of oil the air pressure will be lowest and this would indicate upon the gage the exact quantity of liquid in the tank. As the oil level in the tank lowers the air pressure increases, which will move the index of the gage to indicate the diminished quantity of oil.

To increase the sensitiveness of the apparatus the chamber in which the float G is placed may be divided by an annular wall G' into two compartments as shown in Fig. 2. The oil first enters the inner compartment through apertures O' therein below the normal liquid static level and passes over the top of the partition G' to the outer compartment, which is thereby maintained at substantially constant level. This arrangement permits the fluctuation in levels of the oil within the inner compartment by which the float G operates the valve J, while in the outer compartment a substantially constant level is maintained to produce the best results in the operation of the carbureter.

What I claim as my invention is:—

1. In a liquid fuel supply system for carbureters the combination with a fuel discharge nozzle, of a supply tank arranged at a lower level and in constant communication with said nozzle, and means for maintaining on said tank a pressure exactly balancing the liquid static pressure of a liquid column having a constant level which is above the tank and below the discharge end of the nozzle.

2. In a liquid fuel supply system for carbureters the combination with a discharge nozzle, of a liquid fuel supply tank at a lower level and in constant communication therewith, means for placing air pressure on said tank to elevate the liquid to a level above that of the tank and below that of the nozzle, and means controlled by said level for maintaining a counterbalancing air pressure.

3. In a liquid fuel supply system for carbureters the combination with a discharge nozzle and a float chamber connected therewith, of a supply tank arranged at a lower level and connected with said float chamber and through the latter to said discharge nozzle, means for supplying compressed air to said tank, an escape pipe for the air, a valve controlling said escape pipe, and a float in said float chamber operatively connected with said valve to limit the air pressure on said tank and maintain a substantially constant liquid level in said float chamber, said level being below the discharge end of said nozzle.

4. In a liquid fuel supply system for carbureters, the combination with a discharge nozzle of a float chamber connected therewith, a liquid fuel supply tank at a lower level and connected with said float chamber, means for supplying compressed air to said supply tank, an escape pipe for the air, a valve for restricting said escape pipe, and a float in said float chamber operatively connected with said valve to maintain in said chamber a liquid level below that of the discharge nozzle and above that of the tank.

5. In a liquid fuel supply system for carbureters, the combination with a discharge nozzle, of a float chamber connected therewith, a hollow stem forming an inlet to said chamber, a float sleeved upon said stem, an air escape valve arranged centrally above said stem, a rod resting on said float for unseating said valve, a supply tank at a lower level than said chamber connected with said hollow stem, means for supplying compressed air to said tank, and an escape pipe from said tank leading to said air escape valve.

6. In a liquid fuel supply system for carbureters, the combination with a discharge nozzle of a float chamber in constant communication therewith, a liquid supply tank at a lower level, a conduit connected with said supply tank and discharging into said float chamber at a level, which is below that of said discharge nozzle, means for supplying compressed air to said tank, an escape pipe for the air from said tank, a valve controlling said escape pipe, and a float in said float chamber operatively connected to unseat said valve upon the rise of the float above its normal level.

7. In a liquid fuel supply system for carbureters, the combination of a discharge nozzle, a liquid supply tank at a lower level connected thereto, means for placing air pressure on said tank to elevate the oil, means for varying said pressure to maintain a constant level in relation to said discharge nozzle with changing levels in the supply tank, and means operated by the varying air pressure for indicating the volume of oil in the tank.

8. In a liquid fuel supply system for carbureters, the combination with a discharge nozzle, of a float chamber in constant communication therewith, a liquid supply tank at a lower level, a conduit connected with said supply tank and discharging into said float chamber, a float in said chamber, a partition in said float chamber surrounding said float and of a height corresponding to the normal level of oil to be maintained in said discharge nozzle, means for supplying compressed air to the tank at the lower level, an escape pipe for the air from said tank, a valve controlling said escape pipe, and connections between said float and valve for operating the latter by the fluctuating levels of the oil in the inner compartment of said float chamber.

9. In a liquid fuel supply system for carbureters, the combination with a discharge nozzle, of a float chamber connected therewith, a hollow stem projecting upwardly within the float chamber and formed with a discharge orifice, a float sleeved upon said stem, a supply tank at a lower level than said chamber, a conduit communicating with the lower end of the stem and with the supply tank, means for supplying compressed air to said tank, a valve controlling the escape of air from the supply tank, and connections between the float and valve for operating the latter by the fluctuating levels of the liquid fuel in the float chamber.

10. In a liquid fuel supply system, the combination with a discharge nozzle, of a float chamber having two compartments communicating at their tops, one of which communicates with said nozzle, a float within the other of said compartments, a liquid supply tank at a level below the float chamber, a conduit connected with the supply tank, and discharging into the compartment containing the float, means for supplying compressed air to the supply tank, an escape pipe for the air from said tank, a valve in said escape pipe, and connections between said float and valve, regulating the air pressure in the tank and maintaining the liquid fuel level in the float compartment substantially at the point of overflow into the other compartment.

In testimony whereof I affix my signature in presence of two witnesses.

OTIS C. FUNDERBURK.

Witnesses:
JAMES P. BARRY,
ARTHUR D. PULVER.